(12) United States Patent
Stilson

(10) Patent No.: US 12,066,045 B2
(45) Date of Patent: Aug. 20, 2024

(54) CLAMPING DEVICE

(71) Applicant: Coulter Ventures, LLC., Columbus, OH (US)

(72) Inventor: Tyler Scott Stilson, Frederick, CO (US)

(73) Assignee: Coulter Ventures, LLC., Columbus, OH (US)

( * ) Notice: Subject to any disclaimer, the term of this patent is extended or adjusted under 35 U.S.C. 154(b) by 914 days.

(21) Appl. No.: 16/919,887

(22) Filed: Jul. 2, 2020

(65) Prior Publication Data

US 2021/0001166 A1 Jan. 7, 2021

Related U.S. Application Data

(60) Provisional application No. 62/869,815, filed on Jul. 2, 2019.

(51) Int. Cl.
*F16B 2/18* (2006.01)
*A63B 21/072* (2006.01)
*F16B 2/10* (2006.01)

(52) U.S. Cl.
CPC .......... *F16B 2/185* (2013.01); *A63B 21/0728* (2013.01); *F16B 2/10* (2013.01)

(58) Field of Classification Search
CPC ..... A63B 21/0728; B65D 45/345; F16B 2/06; F16B 2/08; F16B 2/18; F16B 2/185;
(Continued)

(56) References Cited

U.S. PATENT DOCUMENTS 2,274,872 A * 3/1942 Smith, Jr. ............ B65D 45/345
292/256.69
3,113,791 A 12/1963 Frost et al.
(Continued)

FOREIGN PATENT DOCUMENTS

DE 802496 C * 2/1951 ........... B64D 45/345
FR 688355 A * 8/1930 ............. A47L 9/244
(Continued)

OTHER PUBLICATIONS

"Collars—Rogue HG 2.0 Collars", Jul. 3, 2017, roguefitness.com via archive.org, site visited Sep. 10, 2021: https://web.archive.org/web/20170703192542/https://www.roguefitness.com/weightlifting-bars-plates/collars (Year: 2017).
(Continued)

*Primary Examiner* — Josh Skroupa
*Assistant Examiner* — Zachary A Hall
(74) *Attorney, Agent, or Firm* — Banner & Witcoff, Ltd.

(57) ABSTRACT

A clamping device includes a primary member with a central passage and a clamping member connected to the primary member. The clamping member includes an annular body that extends around the central passage between first and second ends. The device also includes an actuator mechanism with an actuator connected to the primary member at a pivot connection, and a pivot arm pivotably connected to the actuator at an eccentric connection spaced from the pivot connection. The actuator pivots between an unlocked position and a locked position, where the pivot arm engages the second end of the clamping member to move the first and second ends closer together. When moving the actuator mechanism from the unlocked to the locked position, the pivot arm travels ahead of the eccentric connection and/or toward the second end of the clamping member. Moving the actuator mechanism from the locked to the unlocked position causes the opposite movement.

26 Claims, 10 Drawing Sheets

(58) Field of Classification Search
CPC ............... F16B 7/1454; Y10T 24/1424; Y10T 403/595; Y10T 403/7071
USPC ........................................................ 482/107
See application file for complete search history.

(56) References Cited

U.S. PATENT DOCUMENTS

| | | | |
|---|---|---|---|
| 4,646,398 A | 3/1987 | Myhrman | |
| 7,243,962 B2* | 7/2007 | Stolzman | B65D 45/345 |
| | | | 292/256.65 |
| 7,261,263 B2* | 8/2007 | Baker | A47F 5/04 |
| | | | 248/316.1 |
| 7,497,489 B2 | 3/2009 | Baughman et al. | |
| 7,513,856 B2 | 4/2009 | Jones | |
| 8,985,647 B2* | 3/2015 | Kuzelka | B65D 45/345 |
| | | | 292/256.65 |
| 9,109,616 B1 | 8/2015 | Ballentine | |
| D780,860 S | 3/2017 | Jones | |
| D780,861 S | 3/2017 | Jones | |
| 9,764,183 B2 | 9/2017 | Roepke | |
| 9,855,458 B2 | 1/2018 | Stilson | |
| 10,226,659 B2 | 3/2019 | Stilson | |
| 10,512,815 B2 | 12/2019 | Stilson | |
| D895,745 S | 9/2020 | Jones | |
| 10,953,263 B2 | 3/2021 | Stilson | |
| D941,408 S | 1/2022 | Jones | |
| 11,359,653 B2* | 6/2022 | Huang | B25B 5/147 |
| D971,720 S | 12/2022 | Jones | |
| D972,056 S | 12/2022 | Jones | |
| 11,565,143 B2 | 1/2023 | Jones | |
| D979,677 S | 2/2023 | Liu | |
| 11,835,073 B2* | 12/2023 | Stilson | F16B 2/08 |
| 2008/0287271 A1 | 11/2008 | Jones | |
| 2017/0095688 A1 | 4/2017 | Stilson | |
| 2017/0144012 A1 | 5/2017 | Stilson | |
| 2018/0185696 A1 | 7/2018 | Stilson | |
| 2018/0326251 A1 | 11/2018 | Stilson | |
| 2019/0105525 A1 | 4/2019 | Stilson | |
| 2020/0171339 A1 | 6/2020 | Jones | |
| 2021/0001165 A1 | 1/2021 | Stilson | |
| 2021/0001166 A1 | 1/2021 | Stilson | |
| 2022/0143453 A1 | 5/2022 | Martin | |

FOREIGN PATENT DOCUMENTS

| | | | | | |
|---|---|---|---|---|---|
| FR | 1116144 | A | * | 5/1956 | ........... B65D 45/345 |
| FR | 1219395 | A | * | 5/1960 | ............... F16B 2/08 |
| KR | 930001671 | Y1 | * | 4/1993 | ............... B63C 5/02 |
| KR | 20130119206 | A | * | 10/2013 | ............... F16L 33/08 |
| WO | WO-2005082221 | A1 | * | 9/2005 | ............. A47L 9/244 |
| WO | WO-2011011773 | A2 | * | 1/2011 | ......... F01N 13/1805 |

OTHER PUBLICATIONS

Powerfeng, announced 2021 [online], [site visited Apr. 25, 2023]. Available on internet, URL:https://www.amazon.com/ <http://www.amazon.com/> Powerfeng-Olympic-Barbell-Clamps-Clips/dp/B09LCY9VZK/ref (Year: 2021).

Lockjaw barbell collars store, announced 2021 [online], [site visited Apr. 25, 2023]. Available on internet, URL:https://www.amazon.com/Lock-Jaw-Release-Aluminum-Barbell-Collar/dp/B09PSKF8YM/ref <http://www.amazon.com/Lock-Jaw-Release-Aluminum-Barbell-Collar/dp/B09PSKF8YM/ref>(Year: 2022).

* cited by examiner

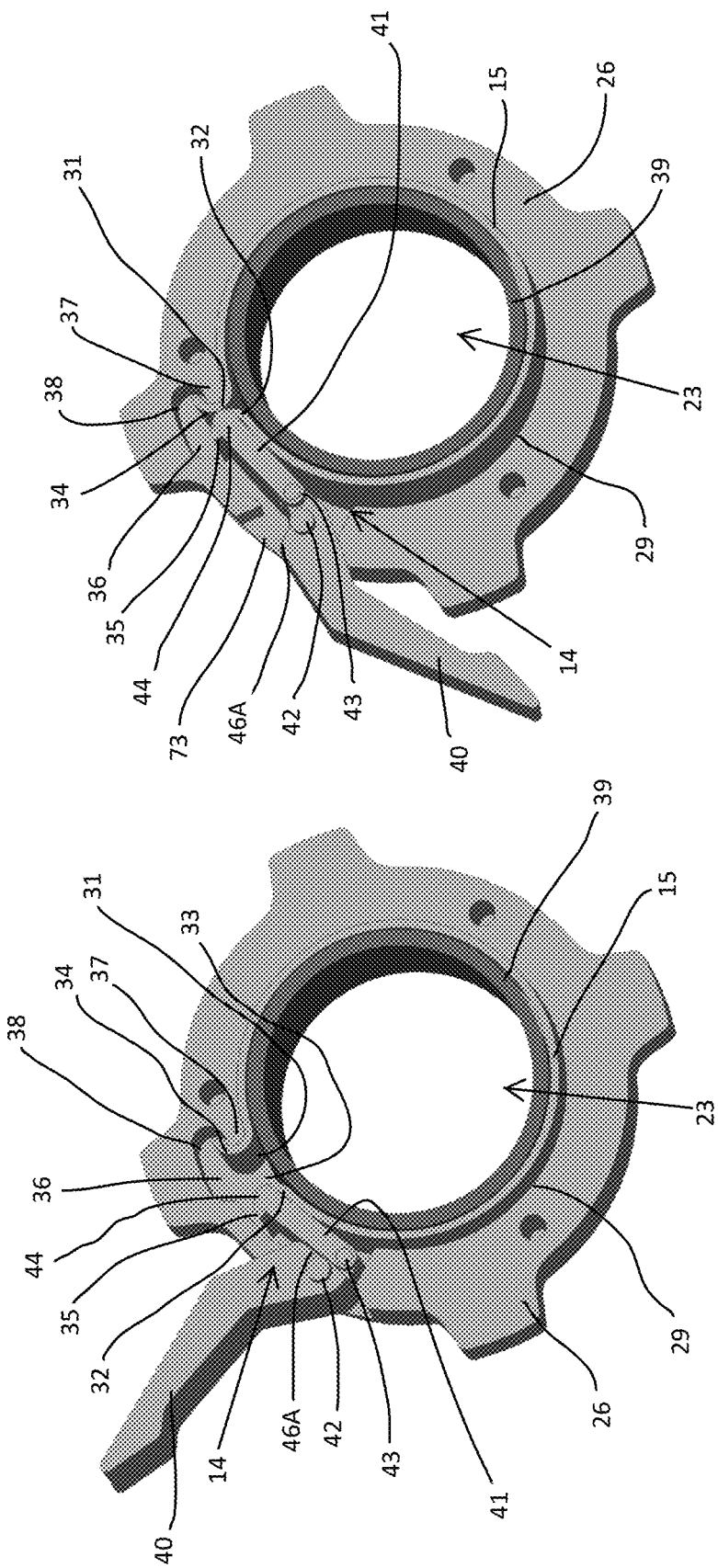

CLAMPING DEVICE

CROSS-REFERENCE TO RELATED APPLICATION

This application is a non-provisional of, and claims priority to, U.S. Provisional Application No. 62/869,815, filed Jul. 2, 2019, which prior application is incorporated by reference herein in its entirety.

FIELD OF THE INVENTION

This disclosure relates to clamping devices, and more specifically to clamping devices in the form of barbell clamps or other clamps designed to secure weights on exercise equipment.

BRIEF SUMMARY

Aspects of the disclosure relate to a clamping device that includes a primary member including a cylindrical body having a front side and a rear side, with a central passage extending in an axial direction from the front side to the rear side and configured for receiving a mounting member therethrough, a clamping member connected to the primary member and configured for selectively engaging the mounting member when the mounting member is received in the central passage, and an actuator mechanism engaged with the clamping member. The clamping member includes a substantially annular body that extends from a first end peripherally around the central passage of the primary member to a second end. The actuator mechanism includes an actuator pivotably connected to the primary member at a pivot connection, the actuator further having an eccentric connection spaced from the pivot connection, and a pivot arm pivotably connected to the actuator at the eccentric connection, where the pivot arm engages the second end of the clamping member. The actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first and second ends closer together, causing the clamping member to securely engage the mounting member to resist movement of the primary member with respect to the mounting member. When moving the actuator mechanism from the unlocked position to the locked position by pivoting the actuator, the pivot arm travels ahead of the eccentric connection in a first direction of travel of the eccentric connection, and/or the pivot arm travels toward the second end of the clamping member to push the second end of the clamping member toward the first end. When moving the actuator mechanism from the locked position to the unlocked position by pivoting the actuator, the pivot arm travels behind the eccentric connection in a second direction of travel of the eccentric connection, and/or the pivot arm travels away from the second end of the clamping member.

According to one aspect, the actuator includes a lever extending from the pivot connection and a protrusion extending from the pivot connection in a different direction from the lever, where the eccentric connection is defined on the protrusion.

According to another aspect, the actuator includes a protrusion extending from the pivot connection, and the eccentric connection is defined on the protrusion. The pivot arm has two legs with a slot defined between the legs, and the protrusion is received in the slot and pivotably connected to the two legs to define the eccentric connection.

According to a further aspect, the first end of the clamping member wraps around a protrusion on the primary member to fixedly connect the first end of the clamping member to the primary member, and the second end of the clamping member wraps around a distal end of the pivot arm to engage the pivot arm.

According to yet another aspect, the cylindrical body of the clamping member has a wall surrounding the central passage, and a cavity is disposed within the wall of the cylindrical body and a slot extends through the wall, from the cavity to an exterior of the cylindrical body. The pivot arm and a portion of the actuator forming the pivot connection and the eccentric connection are received within the cavity, and the actuator further includes a handle that extends out of the cavity through the slot. In one configuration, the cylindrical body further has a circumferential channel extending around the central passage, the channel receiving the clamping member therein, and the circumferential channel is in communication with the cavity, such that the first and second ends of the clamping member extend into the cavity.

According to a still further aspect, the first end and the second end of the clamping member are biased away from each other, such that the second end of the clamping member is biased to follow the pivot arm when the actuator mechanism is moved from the locked position to the unlocked position.

According to an additional aspect, the primary member further includes a first cylindrical piece and a second cylindrical piece fixed together such that the central passage extends through both cylindrical pieces. The pivot arm and a portion of the actuator forming the pivot connection and the eccentric connection are received between the first piece and the second piece.

Additional aspects of the disclosure relate to a clamping device including a primary member including a cylindrical body having a central passage configured for receiving a mounting member therethrough, a clamping member connected to the primary member and configured for selectively engaging the mounting member when the mounting member is received in the central passage, and an actuator mechanism engaged with the clamping member. The clamping member includes a substantially annular body that extends from a first end peripherally around the central passage of the primary member to a second end. The actuator mechanism includes an actuator moveably connected to the primary member and an arm connected to the actuator at a connection point such that movement of the actuator is configured to move the arm, where the arm further engages the second end of the clamping member. The actuator mechanism is configured to be moveable by moving the actuator between an unlocked position, where the first end of the clamping member is spaced from the second end, and the clamping member does not securely engage the mounting member to permit the mounting member to be removed from the central passage, and a locked position, where the arm engages the clamping member to move the first and second ends closer together, causing the clamping member to securely engage the mounting member to resist movement of the primary member with respect to the mounting member. When moving the actuator mechanism from the unlocked position to the locked position by moving the actuator, the arm travels toward the second end of the clamping member and ahead of the connection point in a first direction of travel of the connection point. When moving the actuator mechanism from the locked position to the unlocked position by moving the actuator, the arm travels away from the second end of the clamping member and behind the connection point in a second direction of travel of the connection point.

According to one aspect, the actuator is pivotably connected to the primary member at a pivot connection and includes a lever extending from the pivot connection and a protrusion extending from the pivot connection in a different direction from the lever, where the connection point is an eccentric connection defined on the protrusion.

According to another aspect, the actuator is pivotably connected to the primary member at a pivot connection, the actuator includes a protrusion extending from the pivot connection, and the connection point is an eccentric connection defined on the protrusion. The arm has two legs with a slot defined between the legs, and the protrusion is received in the slot and pivotably connected to the two legs to define the eccentric connection.

According to a further aspect, the first end of the clamping member wraps around a protrusion on the primary member to fixedly connect the first end of the clamping member to the primary member, and the second end of the clamping member wraps around a distal end of the arm to engage the arm.

According to yet another aspect, the cylindrical body of the clamping member has a wall surrounding the central passage, and a cavity is disposed within the wall of the cylindrical body, with a slot extending through the wall, from the cavity to an exterior of the cylindrical body. The arm and a portion of the actuator forming the connection point are received within the cavity, and the actuator further includes a handle that extends out of the cavity through the slot. In one configuration, the cylindrical body further has a circumferential channel extending around the central passage, the channel receiving the clamping member therein, and the circumferential channel is in communication with the cavity, such that the first and second ends of the clamping member extend into the cavity.

According to a still further aspect, the first end and the second end of the clamping member are biased away from each other, such that the second end of the clamping member is biased to follow the arm when the actuator mechanism is moved from the locked position to the unlocked position.

According to an additional aspect, the primary member further includes a first cylindrical piece and a second cylindrical piece fixed together such that the central passage extends through both cylindrical pieces, and the arm and a portion of the actuator forming the connection point are received between the first piece and the second piece.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which:

FIG. 5 is a cut-away front perspective view of the clamping device of FIG. 1 with the actuator mechanism shown in the unlocked position, and further including a gripping member;

FIG. 6 is a cut-away front perspective view of the clamping device of FIG. 5 with the actuator mechanism shown in a locked position;

DETAILED DESCRIPTION

Figure 1:
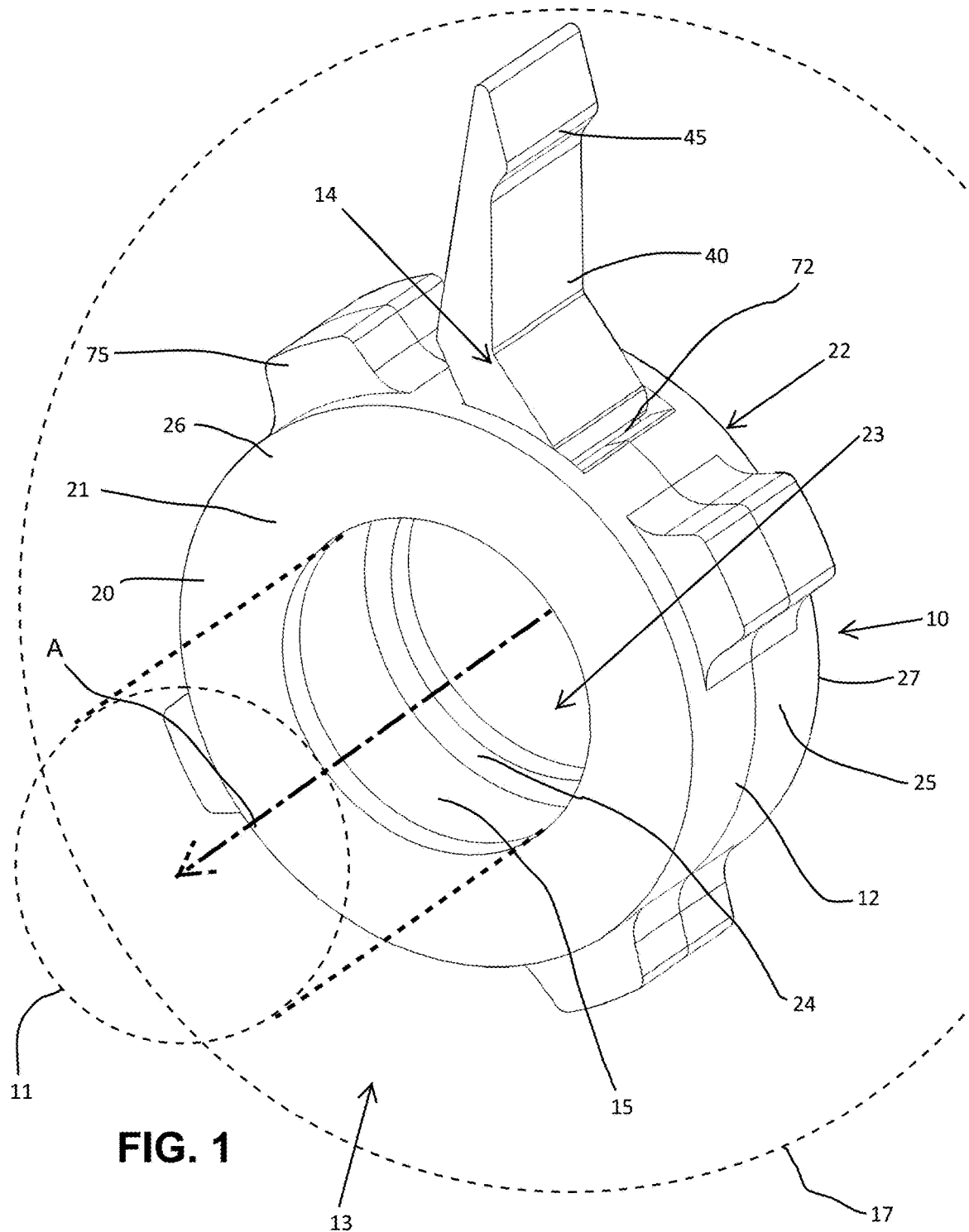
FIG. 1 is a rear perspective view of one embodiment of a clamping device according to aspects of the disclosure, with an actuator mechanism of the clamping device shown in an unlocked position, and with the clamping device mounted on a mounting member in the form of a barbell with a weight plate having a surface confronting the clamping device.
Figure 2:
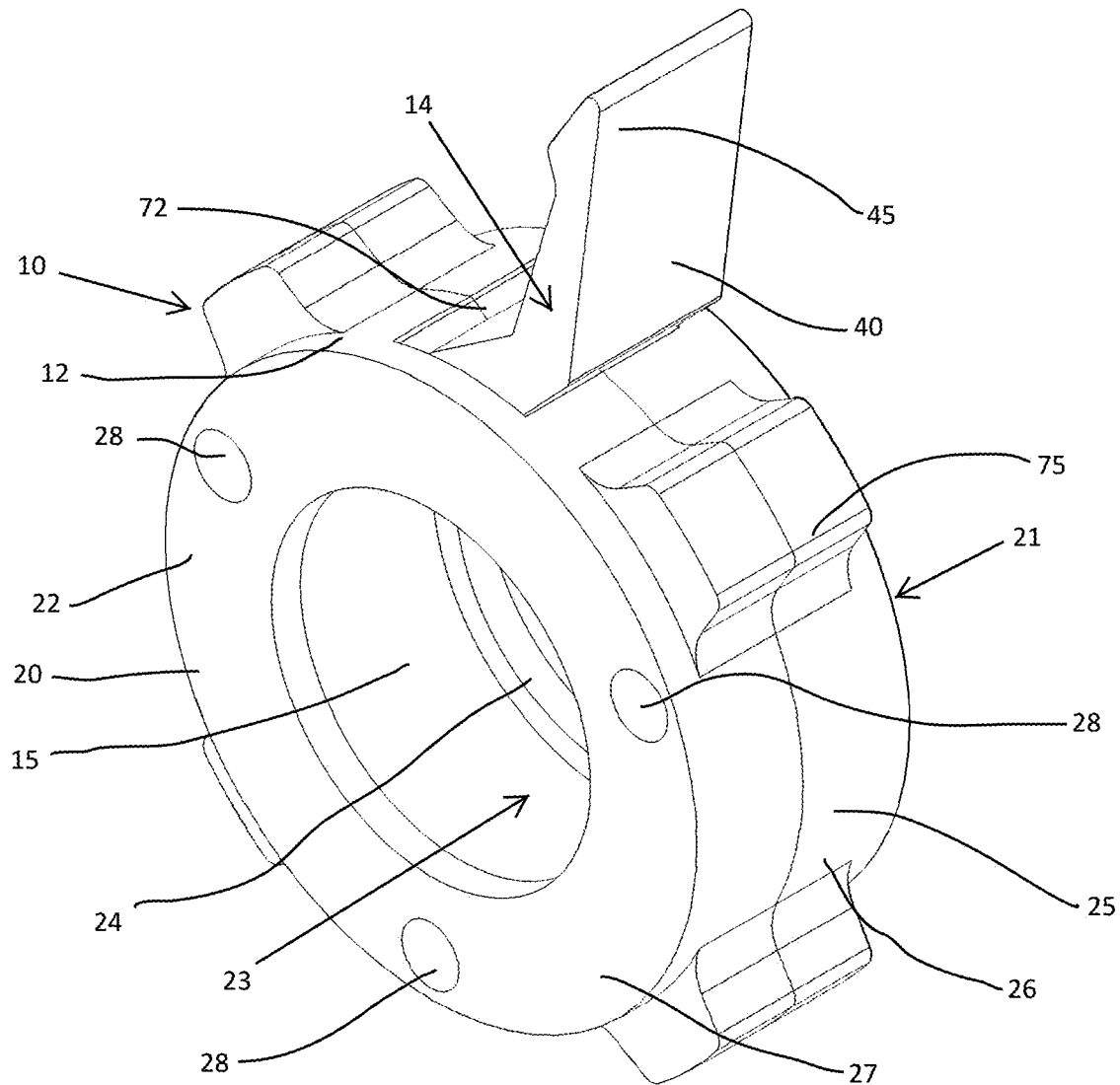
FIG. 2 is a front perspective view of the clamping device of FIG. 1 with the actuator mechanism shown in the unlocked position.
Figure 3:
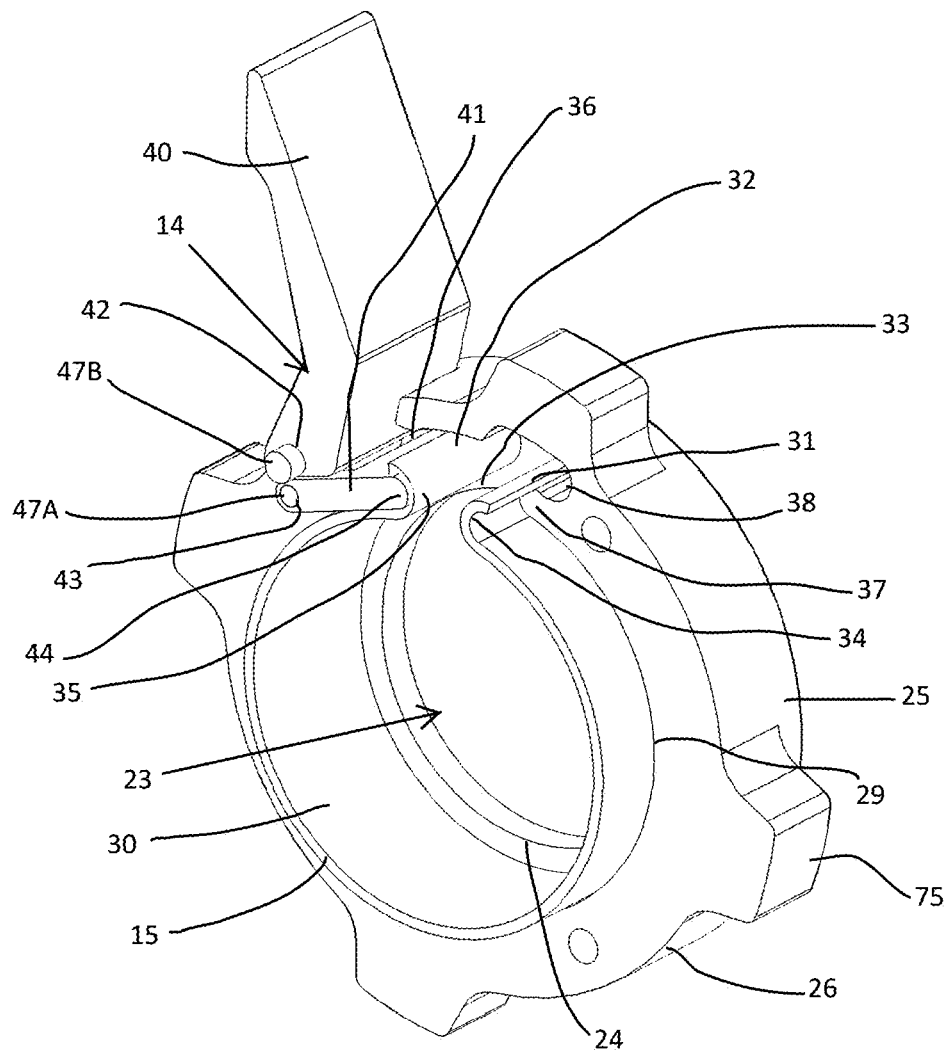
FIG. 3 is a cut-away front perspective view of the clamping device of FIG. 1 with the actuator mechanism shown in the unlocked position.
Figure 4:
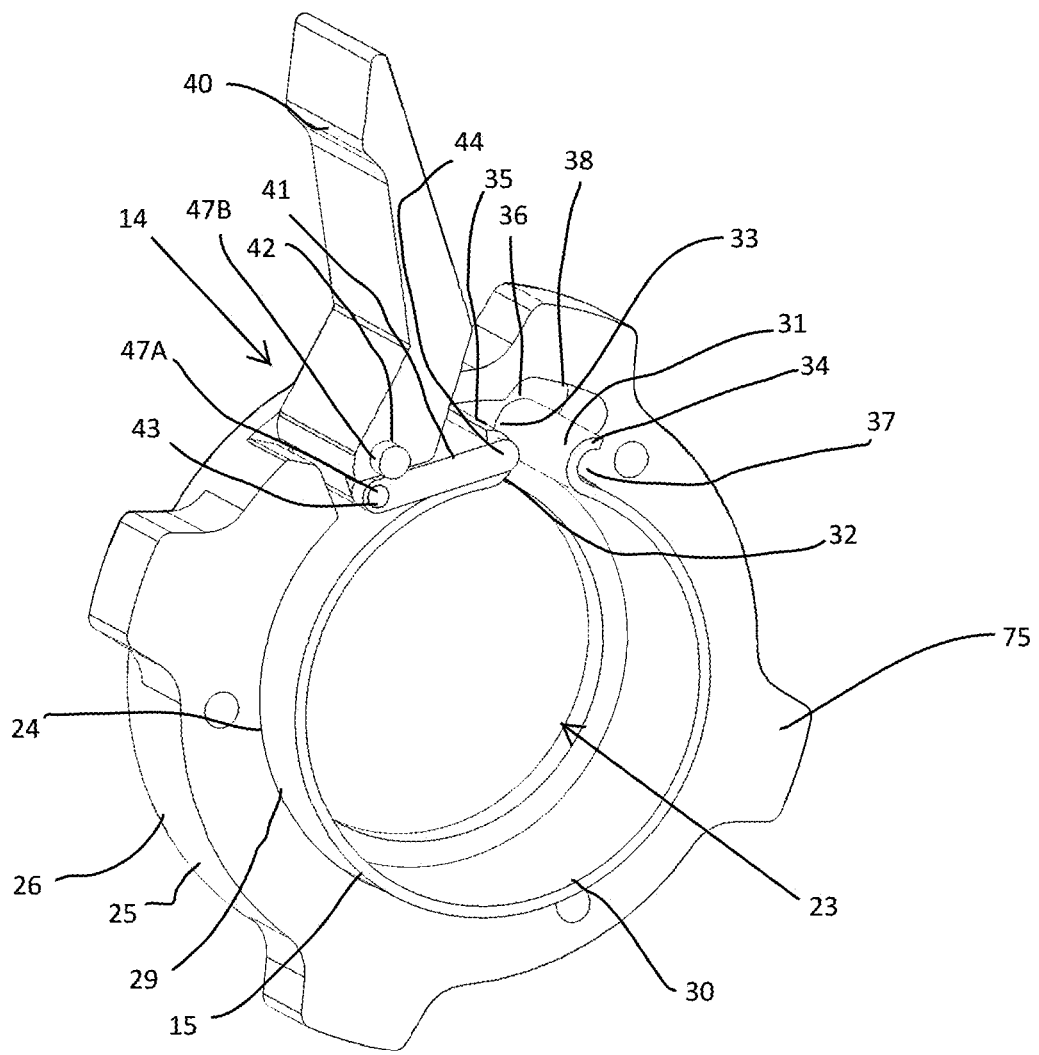
FIG. 4 is a cut-away front view of the clamping device of FIG. 1 with the actuator mechanism shown in the unlocked position.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 8:
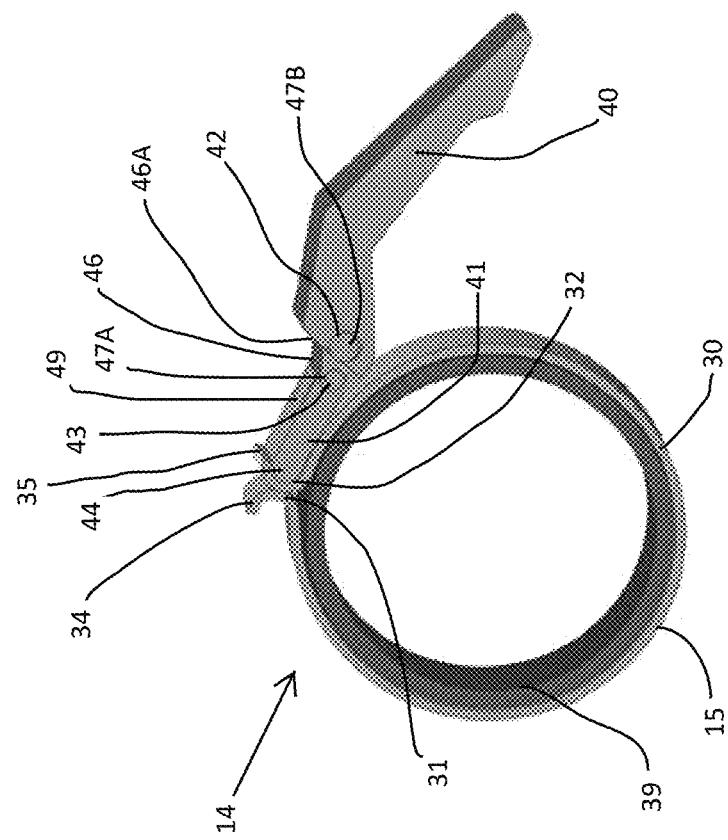
FIG. 8 is a rear perspective view of the clamping member, the actuator mechanism, and the gripping member of the clamping device of FIG. 5 with the actuator mechanism shown in the locked position.

FIGS. 1-12 illustrate one embodiment of a clamping device 10 according to aspects of the disclosure, which is designed to be connected to an elongated, cylindrical mounting member 11. The clamping device 10 in this embodiment is configured for securing one or more weights 13 to the mounting member 11 (see FIG. 1), and the clamping device 10 may be provided in the form of a barbell clamp configured for connection to an mounting member 11 in the form of a barbell. The clamping device 10 in one embodiment includes at least a primary member 12, a clamping member 15 connected to the primary member, and an actuator mechanism 14 configured to engage the clamping member 15 and be moveable between at least a locked position, where the clamping member 15 is configured to be securely engaged with the mounting member 11, and an unlocked position, where the clamping member 15 is configured to not be securely engaged with the mounting member 11 and can be removed from the mounting member 11. FIGS. 1-5 and 7 illustrate the clamping device 10 with the actuator mechanism 14 in the unlocked position, and FIGS. 6 and 8 illustrate the clamping device 10 with the actuator mechanism 14 in the locked position. The clamping device 10 may be positioned in engagement with a surface 17 adjacent to the position of the clamping device 10 on the mounting member 11 (e.g., the side of one or more of the weight(s) 13). The surface 17 may be substantially vertical and/or substantially perpendicular to the axis of elongation of the mounting member 11 in certain configurations. Additionally, the surface 17 may be a surface of a structure mounted on the mounting member 11, such as a weight or weights 13.

The primary member 12 in the embodiment of FIGS. 1-12 is generally cylindrical in shape and includes a generally cylindrical body 20 having a front side 21 and a rear side 22, with a circular central passage 23 extending through the cylindrical body 20 along an axial direction A from the front side 21 to the rear side 22. The cylindrical body 20 also has an inner surface 24 defining the central passage 23 and an outer surface 25 opposite the inner surface 24. In one embodiment, the cylindrical body 20 is at least partially or completely formed of a metallic material such as aluminum, or another alloy such as stainless steel or other steel, etc. In the embodiment of FIGS. 1-12, the cylindrical body 20 is formed of two pieces 26, 27 that are held together with fasteners 28 to form a unitary body. The cylindrical body 20 further has lugs 75 on the outer surface 25. The cylindrical body 20 may be formed of a single, integral piece of aluminum or other metallic material in another embodiment. The inner surface 24 and the outer surface 25 of the cylindrical body 20 are illustrated as defining circular inner and outer peripheries, and in other embodiments, one or both of the inner and outer surfaces 24, 25 may define a non-circular periphery. For example, in one embodiment, the inner surface 24 may define a circular passage 23 with an outer surface 25 that defines a non-circular shape.

Figure 7:
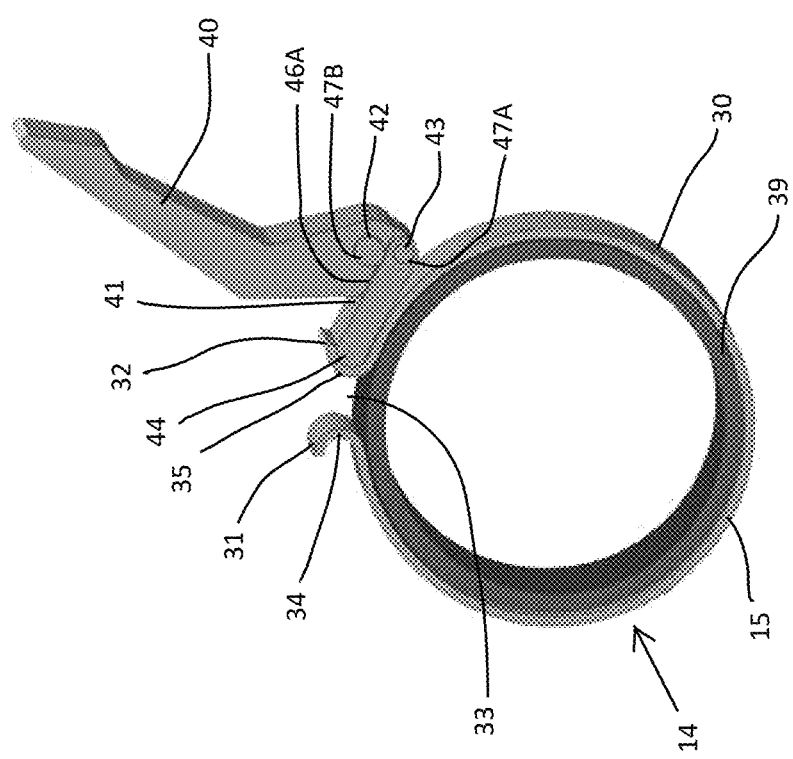
FIG. 7 is a rear perspective view of a clamping member, an actuator mechanism, and the gripping member of the clamping device of FIG. 5 with the actuator mechanism shown in the unlocked position.
Figure 9:
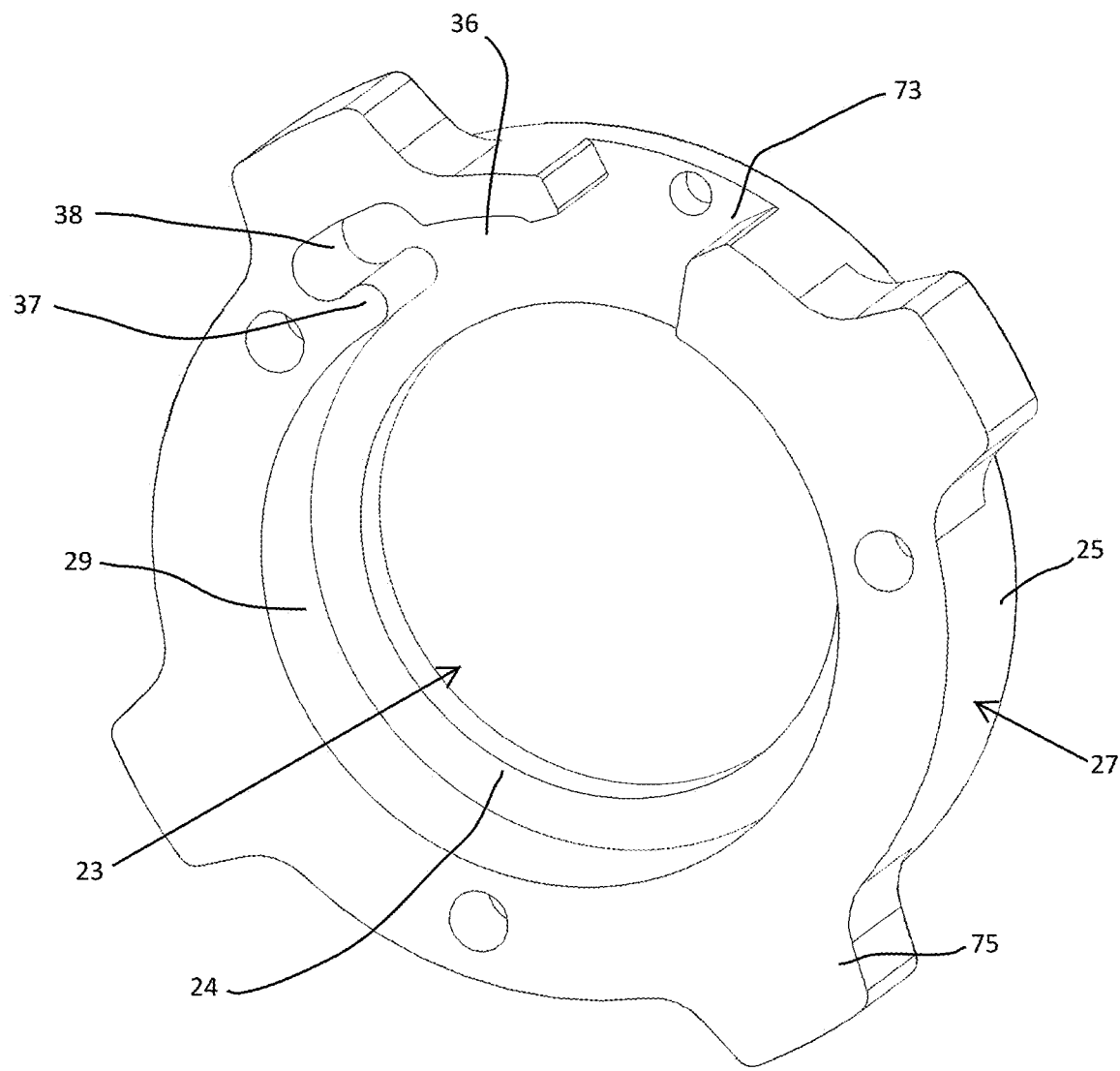
FIG. 9 is a rear perspective view of a first piece of a primary member of the clamping device of FIG. 1.
Figure 10:
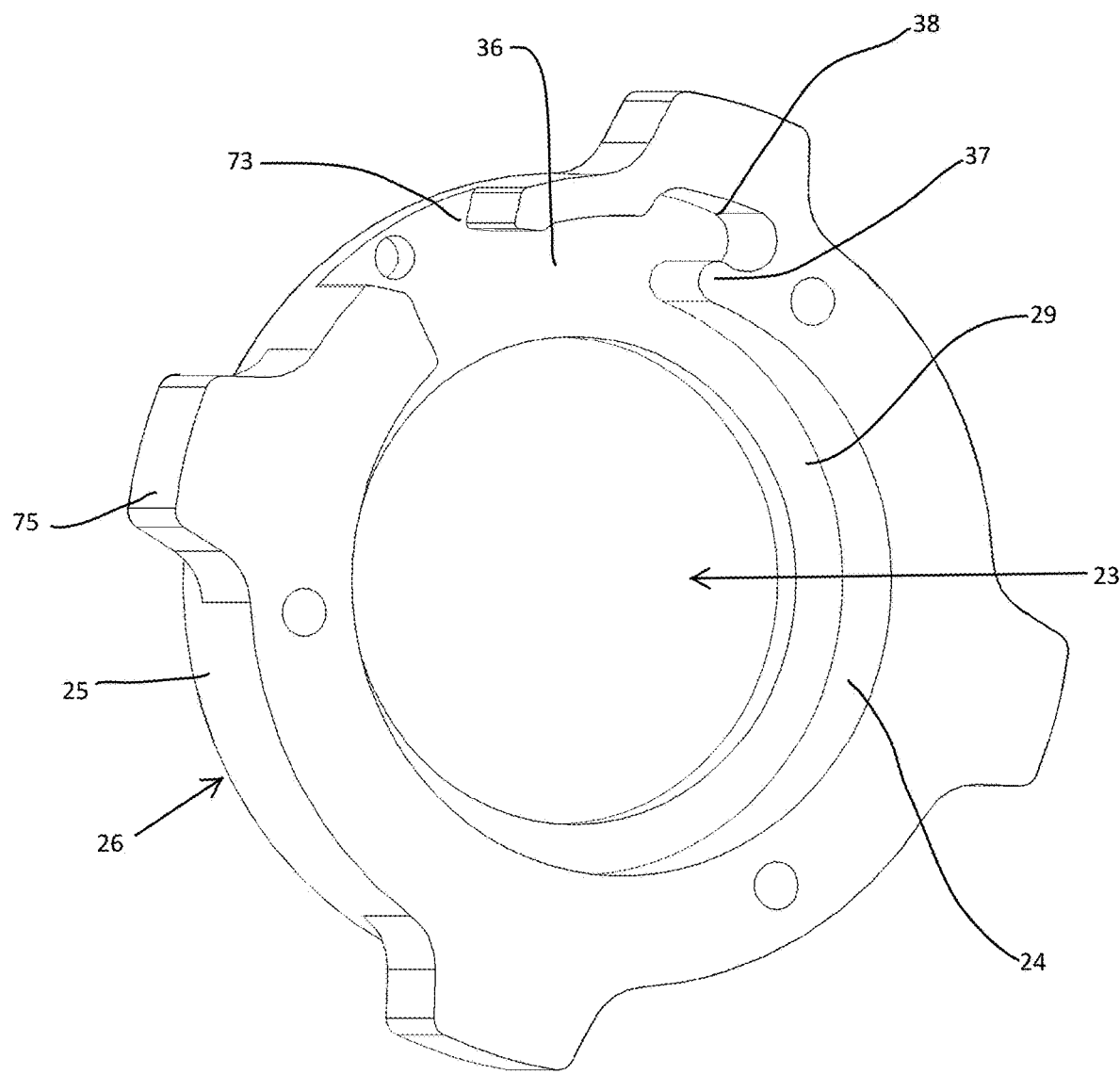
FIG. 10 is a front perspective view of a second piece of a primary member of the clamping device of FIG. 1.
Figure 11:
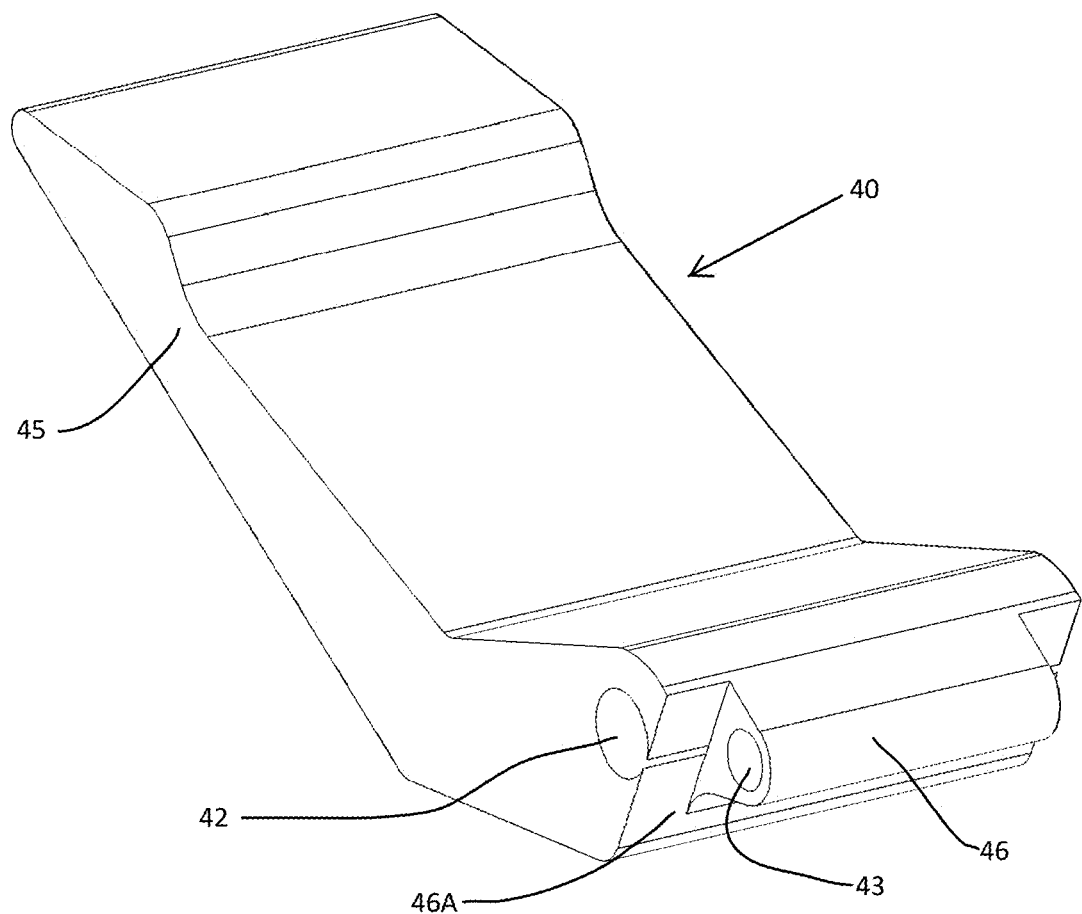
FIG. 11 is a perspective view of an actuator of the clamping device of FIG. 1.

The clamping member 15 in the embodiment of FIGS. 1-12 is in the form of a substantially annular body 30 that extends from a first end 31 peripherally or circumferentially around the central passage 23 of the primary member 12 to the second end 32. In this context, a "substantially annular" structure refers to a structure that has an annular or ring-like structure, but may not form a complete annulus or ring. A gap 33 exists between the ends 31, 32, such that the inner dimension (i.e., width/diameter or perimeter/circumference) of the clamping member 15 can be increased or decreased by moving the ends 31, 32 closer to or further away from each other, or in other words, decreasing or increasing the width of the gap 33. The actuator mechanism 14 in this embodiment is configured for movement between a locked position and an unlocked position to manipulate the clamping member 15 to move the ends 31, 32 closer together in the locked position (FIGS. 6 and 8) and farther apart in the unlocked position (FIGS. 5 and 7). The clamping member 15 is biased toward the unlocked position in this embodiment, such as by an expansive spring force formed by bending the clamping member 15.

The cylindrical body 20 of the primary member 12 in FIGS. 1-12 has a circumferential channel 29 on the inner surface 24 that receives the clamping member 15, such that the body 30 of the clamping member 15 extends around the inner surface 24 of the cylindrical body 20. The depth of the channel 29 is such that the clamping member 15 does not interfere with insertion of the mounting member 11 through the passage 23 when the actuator 40 is in the unlocked position. The primary member 12 also has a cavity 36 (or cavities) within the wall of the cylindrical body 20 for receiving and engaging portions of the clamping member 15 and the actuator mechanism 14 to permit operation of the same. The cylindrical body 20 in FIGS. 1-12 has a single cavity 36 that is open both at the inner and outer surfaces 24, 25 of the cylindrical body 20, but multiple cavities may be used in other embodiments. Additionally, the primary member 12 in the embodiment of FIGS. 1-12 has an opening 72 extending inward from the outer surface 25 to the cavity 36, which is defined by opposing slots 73 in the two pieces 26, 27. The opening 72 may have angled or beveled edges in one embodiment.

The clamping member 15 has connection members 34, 35 at the ends 31, 32 that are engaged with the primary member 12 and the actuation mechanism 14 to connect the clamping member 15 to the primary member 12 and to the actuation mechanism 14. Both of the connection members 34, 35 in the embodiment of FIGS. 1-12 are in the form of hook-shaped lips that engage complementary structures on the primary member 12 and the actuation mechanism 14 by receiving a portion of the primary member 12 or the actuation mechanism 14 behind and/or beneath the connection member 34, 35, such that the biasing force on the clamping member 15 presses the connection members 34, 35 into engagement with the primary member 12 and the actuation mechanism 14. The first connection member 34 in this embodiment is connected to the primary member 12 by engaging a protrusion 37 on the primary member 12 and wrapping around the protrusion 37 so that a portion of the first connection member 34 is received in a notch 38 adjacent the protrusion 37 that forms a portion of the cavity 36. The second connection member 35 is engaged with the actuator mechanism 14 in a similar manner, and one embodiment of such engagement is described in greater detail herein.

In the embodiment of FIGS. 1-12, the clamping member 15 may have one or more gripping members 39 positioned on the inner surface 25 and configured to engage the mounting member 11 to increase friction between the clamping member 15 and the mounting member 11. In one embodiment, the gripping member(s) 39 may be formed of a material that is softer than the material of the clamping member 15 and with a higher coefficient of friction, such as a rubber material, a polyurethane material, or other polymer material. The material of the gripping member(s) 39 may also be compressible, such that reducing the width of the clamping member 15 in the locked position compresses the gripping member(s) 39 between the clamping member 15 and the mounting member 11. The gripping member(s) 39 may be received within a notch or channel in the clamping member 15 in one embodiment. FIGS. 5-8 show one embodiment of a gripping member 39 in the form of an annular member positioned around the inner surface of the clamping member 15 and formed of a high-friction resilient material.

The actuator mechanism 14 includes an actuator 40 in the form of a lever or other pivoting member connected to the primary member 12 and configured to be manipulated by a user, and a pivot arm 41 connected to the actuator 40 and configured to engage the second end 32 of the clamping member 15 to push the first and second ends 31, 32 of the clamping member 15 together when the actuator 40 is moved to the locked position. In the embodiment of FIGS. 1-12, the actuator 40 is in the form of a cam lever that has a pivot connection 42 connected to the primary member 12 and an eccentric connection 43 spaced from the pivot connection 42, where the pivot arm 41 is connected to the actuator 40 at the eccentric connection 43. The actuator 40 further has a handle 45 extending outward and configured for gripping by a user for manipulation of the actuator 40. In the embodiment of FIGS. 1-12, the pivot connection 42 is positioned between the eccentric connection 43 and the handle 45. The eccentric connection 43 in this embodiment is positioned on a protrusion 46 extending from the actuator 40 at the end opposite the handle 45, thereby spacing the eccentric connection 43 from the pivot connection 42. The protrusion 46 in the embodiment shown in FIG. 11 has a rounded end, and the actuator 40 has a flat end surface 46A, such that the protrusion 46 extends from the flat end surface 46A and has a smaller width and length than the flat end surface 46. The pivot arm 41 also has a distal end 44 spaced from the eccentric connection 43 and configured to engage the second connection member 35 of the clamping member 15. A portion of the pivot arm 41 (e.g., the end 44 thereof) is positioned behind and/or beneath the second connection member 35, such that the second connection member 35 wraps around the portion of the pivot arm 41.

In the configuration of FIGS. 1-12, the actuator 40 pivots about the pivoting connection 42 in moving between the locked and unlocked positions, and pivoting of the actuator 40 results in generally tangential movement of the pivot arm 41 toward or away from the first end 31 of the clamping member 31. With reference to FIGS. 5-6, the actuator 40 pivots counterclockwise to move from the unlocked position (FIG. 5) to the locked position (FIG. 6), and this pivoting causes counterclockwise revolution of the eccentric connection 43 about the pivot connection 42, pushing the pivot arm 41 to the right. This action pushes the second end 32 of the clamping member 15 toward the first end 31 to narrow the inner width of the clamping member, causing the clamping member 15 to engage the mounting member 11. Again with reference to FIGS. 5-6, the actuator 40 pivots clockwise to move from the locked position (FIG. 6) to the unlocked position (FIG. 5), and this pivoting causes clockwise revolution of the eccentric connection 43 about the pivot connection 42, pulling the pivot arm 41 to the left. This action allows the second end 32 of the clamping member 15 to separate from the first end 31 via the biasing force of the clamping member 15 to increase the inner width of the clamping member 15 to release the mounting member 11. It is understood that the relative directions of movement of these components are reversed in FIGS. 7-8, which are viewed from the opposite direction. Viewed another way, the actuator 40 pivots such that the handle 45 rotates toward the outer surface 25 of the primary member 12 when moving from the unlocked position to the locked position, and the reverse is true when moving from the locked position to the unlocked position. In this configuration, the actuator 40 "pushes" the pivot arm 41 when moving from the unlocked position to the locked position, such that the pivot arm 41 travels ahead of the eccentric connection 43 in the direction of travel, and the actuator 40 "pulls" the pivot arm 41 when moving from the locked position to the unlocked position, such that the pivot arm 41 travels behind the eccentric connection 43 in the direction of travel.

Figure 12:
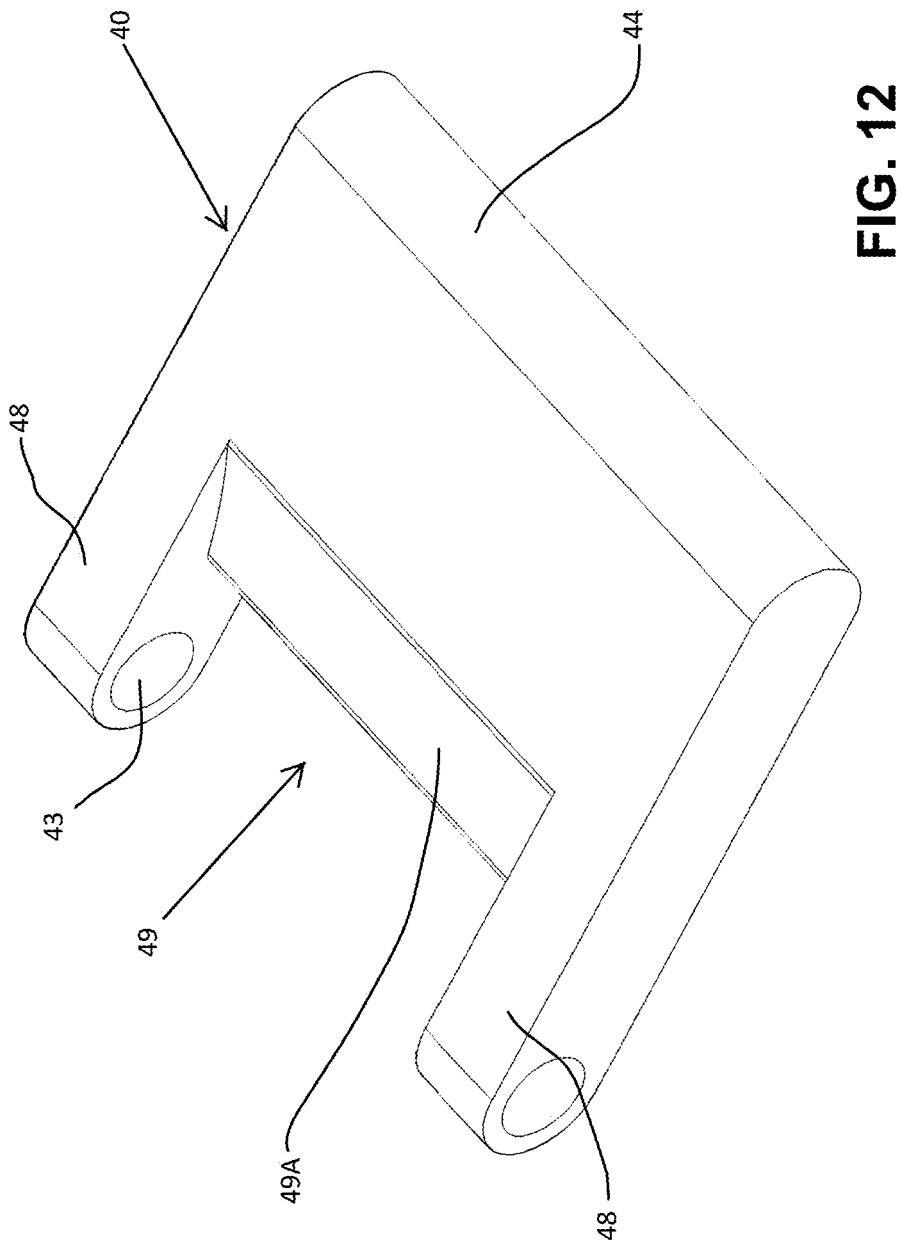
FIG. 12 is a perspective view of a pivot arm of the clamping device of FIG. 1.

The actuator 40 and the pivot arm 41 in FIGS. 1-12 are connected together and to the primary member 12 within the cavity 36, such that the pivot connection 42 and the eccentric connection 43 are positioned within the cavity 36. The pivot arm 41 in FIGS. 1-12 is in the form of a plate-like member having two legs 48 with a slot or space 49 therebetween, and a portion of the actuator 40 is positioned between the legs 48. The actuator 40 in FIGS. 1-12 has at least the protrusion 43 positioned between the legs 48 and within the slot 49 of the pivot arm 41. As shown in FIGS. 3-5 and 7, the flat end surface 46A rests flat against the top surfaces of both legs 48 of the pivot arm 41 when the actuator 40 is in the unlocked position. The pivot arm 41 also has an angled or beveled surface 49A extending between the legs 48 at the end of the recess 49, as shown in FIG. 12. In the configuration of FIGS. 1-12, a pin 47A extends through at least one (or both) of the legs 48 and the actuator 40 to connect the actuator 40 with the pivot arm 41, forming the eccentric connection 43. The actuator 40 is also connected to the primary member 12 by a pin 47B that extends through the actuator 40 and into the cylindrical body 20 on one or both sides of the cavity 36 to form the pivot connection 42. In the embodiment of FIGS. 1-12, the actuator 40 extends into the cavity 36 through the opening 72 in the primary member 12. The actuator mechanism 14 may have a different structural and/or functional configuration in other embodiments.

The clamping device 10 in FIGS. 1-12 can be operated by first inserting the mounting member 11 axially through the central passage 23 of the primary member 12 and moving the clamping device 10 axially toward the surface 17 until the clamping device 10 reaches the desired position. In general, the desired position will have the front side 21 of the primary member 12 engaging or closely confronting the surface 17. As described herein, in one embodiment, the mounting member 11 may be a portion of a barbell, and the surface 17 may be the surface of a weight plate mounted on the barbell. The actuator mechanism 14 can be placed in the unlocked position during insertion of the mounting member 11, and when the clamping device 10 is in the desired position, the actuator mechanism 14 is moved to the locked position, e.g., by rotating the actuator 40 as described herein. The clamping device 10 can be removed from the mounting member 11 by placing the actuator mechanism 14 in the unlocked position and then sliding the clamping device 10 axially until disengaged from the mounting member 11.

Various embodiments of clamping devices have been described herein, which include various components and features. In other embodiments, the clamping device may be provided with any combination of such components and features. It is also understood that in other embodiments, the various devices, components, and features of the clamping device described herein may be constructed with similar structural and functional elements having different configurations, including different ornamental appearances.

The embodiments of clamping devices 10 disclosed herein provide benefits and advantages with respect to existing barbell collars and other clamping devices. The configurations of the actuator mechanism 14 and the clamping member 15 permit secure, reliable engagement of a barbell or other mounting member 11 that can exert significant clamping force to resist movement under large axial loads. As one example, a configuration using a gripping member where the barbell is engaged only by rubber or other resilient material permits high clamping forces to be exerted without damaging the barbell. As another example, the clamping device can generate clamping force that is equal or superior to other existing clamping devices, while requiring less user exertion force to do so. As a further example, the 360° contact between the clamping member and the barbell provides excellent holding force compared to existing clamping members. As a further example, the use of an annular construction that extends around the entire barbell improves the durability of the design. Still further benefits and advantages are readily recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "front," "back," "side," "rear," "proximal," "distal," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. "Integral joining technique," as used herein, means a technique for joining two pieces so that the two pieces effectively become a single, integral piece, including, but not limited to, irreversible joining techniques such as welding, brazing, soldering, or the like, where separation of the joined pieces cannot be accomplished without structural damage thereto. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A clamping device comprising:
    a primary member comprising a cylindrical body having a front side and a rear side, with a central passage extending in an axial direction from the front side to the rear side and configured for receiving a mounting member therethrough;
    a clamping member connected to the primary member and configured for selectively engaging the mounting member when the mounting member is received in the central passage, the clamping member comprising a substantially annular body that extends from a first end peripherally around the central passage of the primary member to a second end, wherein the cylindrical body of the clamping member has a wall surrounding the central passage, wherein a cavity is disposed within the wall of the cylindrical body and a slot extends through the wall, from the cavity to an exterior of the cylindrical body; and
    an actuator mechanism engaged with the clamping member and comprising:
        an actuator pivotably connected to the primary member at a pivot connection, the actuator further having an eccentric connection spaced from the pivot connection; and
        a pivot arm pivotably connected to the actuator at the eccentric connection, wherein the pivot arm engages the second end of the clamping member, wherein the pivot arm and a portion of the actuator forming the pivot connection and the eccentric connection are received within the cavity, and wherein the actuator further includes a handle that extends out of the cavity through the slot,
    wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and
    wherein when moving the actuator mechanism from the unlocked position to the locked position by pivoting the actuator, the pivot arm travels ahead of the eccentric connection in a first direction of travel of the eccentric connection, and when moving the actuator mechanism from the locked position to the unlocked position by pivoting the actuator, the pivot arm travels behind the eccentric connection in a second direction of travel of the eccentric connection.

2. The clamping device of claim 1, wherein the actuator comprises a lever extending from the pivot connection and a protrusion extending from the pivot connection in a different direction from the lever, wherein the eccentric connection is defined on the protrusion.

3. The clamping device of claim 1, wherein the actuator comprises a protrusion extending from the pivot connection, and the eccentric connection is defined on the protrusion, and wherein the pivot arm has two legs with a slot defined between the legs, and wherein the protrusion is received in the slot and pivotably connected to the two legs to define the eccentric connection.

4. The clamping device of claim 1, wherein the first end of the clamping member wraps around a protrusion on the primary member to fixedly connect the first end of the clamping member to the primary member, and wherein the second end of the clamping member wraps around a distal end of the pivot arm to engage the pivot arm.

5. The clamping device of claim 1, wherein the cylindrical body further has a circumferential channel extending around the central passage, the circumferential channel receiving the clamping member therein, and wherein the circumferential channel is in communication with the cavity, such that the first end and the second end of the clamping member extend into the cavity.

6. The clamping device of claim 1, wherein the first end and the second end of the clamping member are biased away from each other, such that the second end of the clamping member is biased to follow the pivot arm when the actuator mechanism is moved from the locked position to the unlocked position.

7. A clamping device comprising:
    a primary member comprising a cylindrical body having a front side and a rear side, with a central passage extending in an axial direction from the front side to the rear side and configured for receiving a mounting member therethrough, wherein the primary member further comprises a first cylindrical piece and a second cylindrical piece fixed together such that the central passage extends through both the first and second cylindrical pieces;

a clamping member connected to the primary member and configured for selectively engaging the mounting member when the mounting member is received in the central passage, the clamping member comprising a substantially annular body that extends from a first end peripherally around the central passage of the primary member to a second end; and an actuator mechanism engaged with the clamping member and comprising:
- an actuator pivotably connected to the primary member at a pivot connection, the actuator further having an eccentric connection spaced from the pivot connection; and
- a pivot arm pivotably connected to the actuator at the eccentric connection, wherein the pivot arm engages the second end of the clamping member, and wherein the pivot arm and a portion of the actuator forming the pivot connection and the eccentric connection are received between the first cylindrical piece and the second cylindrical piece of the primary member,
- wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and
- wherein when moving the actuator mechanism from the unlocked position to the locked position by pivoting the actuator, the pivot arm travels toward the second end of the clamping member to push the second end of the clamping member toward the first end, and when moving the actuator mechanism from the locked position to the unlocked position by pivoting the actuator, the pivot arm travels away from the second end of the clamping member.

8. The clamping device of claim 7, wherein the actuator comprises a lever extending from the pivot connection and a protrusion extending from the pivot connection in a different direction from the lever, wherein the eccentric connection is defined on the protrusion.

9. The clamping device of claim 7, wherein the actuator comprises a protrusion extending from the pivot connection, and the eccentric connection is defined on the protrusion, and wherein the pivot arm has two legs with a slot defined between the legs, and wherein the protrusion is received in the slot and pivotably connected to the two legs to define the eccentric connection.

10. The clamping device of claim 7, wherein the first end of the clamping member wraps around a protrusion on the primary member to fixedly connect the first end of the clamping member to the primary member, and wherein the second end of the clamping member wraps around a distal end of the pivot arm to engage the pivot arm.

11. The clamping device of claim 7, wherein the first end and the second end of the clamping member are biased away from each other, such that the second end of the clamping member is biased to follow the pivot arm when the actuator mechanism is moved from the locked position to the unlocked position.

12. A clamping device comprising:
a primary member comprising a cylindrical body having a central passage configured for receiving a mounting member therethrough;

a clamping member connected to the primary member and configured for selectively engaging the mounting member when the mounting member is received in the central passage, the clamping member comprising a substantially annular body that extends from a first end peripherally around the central passage of the primary member to a second end; and an actuator mechanism engaged with the clamping member and comprising:
- an actuator pivotably connected to the primary member at a pivot connection and comprises a lever extending from the pivot connection and a protrusion extending from the pivot connection in a different direction from the lever, the actuator having an eccentric connection defined on the protrusion; and
- an arm connected to the actuator at the eccentric connection, such that movement of the actuator is configured to move the arm, wherein the arm further engages the second end of the clamping member,
- wherein the actuator mechanism is configured to be moveable by moving the actuator between an unlocked position, where the first end of the clamping member is spaced from the second end, and the clamping member does not securely engage the mounting member to permit the mounting member to be removed from the central passage, and a locked position, where the arm engages the clamping member to move the first end and the second end closer together, causing the clamping member to securely engage the mounting member to resist movement of the primary member with respect to the mounting member, and
- wherein when moving the actuator mechanism from the unlocked position to the locked position by moving the actuator, the arm travels toward the second end of the clamping member and ahead of the eccentric connection in a first direction of travel of the eccentric connection, and when moving the actuator mechanism from the locked position to the unlocked position by moving the actuator, the arm travels away from the second end of the clamping member and behind the eccentric connection in a second direction of travel of the eccentric connection.

13. The clamping device of claim 12, wherein the arm has two legs with a slot defined between the legs, and wherein the protrusion is received in the slot and pivotably connected to the two legs to define the eccentric connection.

14. The clamping device of claim 12, wherein the first end of the clamping member wraps around a protrusion on the primary member to fixedly connect the first end of the clamping member to the primary member, and wherein the second end of the clamping member wraps around a distal end of the arm to engage the arm.

15. The clamping device of claim 12, wherein the cylindrical body of the clamping member has a wall surrounding the central passage, wherein a cavity is disposed within the wall of the cylindrical body and a slot extends through the wall, from the cavity to an exterior of the cylindrical body, wherein the arm and a portion of the actuator forming the eccentric connection are received within the cavity, and wherein the lever further includes a handle extends out of the cavity through the slot.

16. The clamping device of claim 15, wherein the cylindrical body further has a circumferential channel extending around the central passage, the circumferential channel receiving the clamping member therein, and wherein the circumferential channel is in communication with the cavity, such that the first end and the second end of the clamping member extend into the cavity.

17. The clamping device of claim 12, wherein the first end and the second end of the clamping member are biased away from each other, such that the second end of the clamping member is biased to follow the arm when the actuator mechanism is moved from the locked position to the unlocked position.

18. The clamping device of claim 12, wherein the primary member further comprises a first cylindrical piece and a second cylindrical piece fixed together such that the central passage extends through both cylindrical pieces, and wherein the arm and a portion of the actuator forming the eccentric connection are received between the first cylindrical piece and the second cylindrical piece.

19. A clamping device comprising:
   a primary member comprising a cylindrical body having a central passage configured for receiving a mounting member therethrough;
   a clamping member connected to the primary member and configured for selectively engaging the mounting member when the mounting member is received in the central passage, the clamping member comprising a substantially annular body that extends from a first end peripherally around the central passage of the primary member to a second end; and
   an actuator mechanism engaged with the clamping member and comprising:
      an actuator moveably connected to the primary member; and
      an arm connected to the actuator at a connection point such that movement of the actuator is configured to move the arm, wherein the arm further engages the second end of the clamping member,
      wherein the actuator mechanism is configured to be moveable by moving the actuator between an unlocked position, where the first end of the clamping member is spaced from the second end, and the clamping member does not securely engage the mounting member to permit the mounting member to be removed from the central passage, and a locked position, where the arm engages the clamping member to move the first end and the second end closer together, causing the clamping member to securely engage the mounting member to resist movement of the primary member with respect to the mounting member,
      wherein when moving the actuator mechanism from the unlocked position to the locked position by moving the actuator, the arm travels toward the second end of the clamping member and ahead of the connection point in a first direction of travel of the connection point, and when moving the actuator mechanism from the locked position to the unlocked position by moving the actuator, the arm travels away from the second end of the clamping member and behind the connection point in a second direction of travel of the connection point, and
      wherein the primary member further comprises a first cylindrical piece and a second cylindrical piece fixed together such that the central passage extends through both cylindrical pieces, and wherein the arm and a portion of the actuator forming the connection point are received between the first cylindrical piece and the second cylindrical piece.

20. A clamping device comprising:
   a primary member comprising a cylindrical body having a central passage configured for receiving a mounting member therethrough;
   a clamping member connected to the primary member and configured for selectively engaging the mounting member when the mounting member is received in the central passage, the clamping member comprising a substantially annular body that extends from a first end peripherally around the central passage of the primary member to a second end; and
   an actuator mechanism engaged with the clamping member and comprising:
      an actuator moveably connected to the primary member; and
      an arm connected to the actuator at a connection point such that movement of the actuator is configured to move the arm, wherein the arm further engages the second end of the clamping member,
      wherein the actuator mechanism is configured to be moveable by moving the actuator between an unlocked position, where the first end of the clamping member is spaced from the second end, and the clamping member does not securely engage the mounting member to permit the mounting member to be removed from the central passage, and a locked position, where the arm engages the clamping member to move the first end and the second end closer together, causing the clamping member to securely engage the mounting member to resist movement of the primary member with respect to the mounting member,
      wherein when moving the actuator mechanism from the unlocked position to the locked position by moving the actuator, the arm travels toward the second end of the clamping member and ahead of the connection point in a first direction of travel of the connection point, and when moving the actuator mechanism from the locked position to the unlocked position by moving the actuator, the arm travels away from the second end of the clamping member and behind the connection point in a second direction of travel of the connection point, and
      wherein the cylindrical body of the clamping member has a wall surrounding the central passage, wherein a cavity is disposed within the wall of the cylindrical body and a slot extends through the wall, from the cavity to an exterior of the cylindrical body, wherein the arm and a portion of the actuator forming the connection point are received within the cavity, and wherein the actuator further includes a handle that extends out of the cavity through the slot.

21. The clamping device of claim 20, wherein the cylindrical body further has a circumferential channel extending around the central passage, the circumferential channel receiving the clamping member therein, and wherein the circumferential channel is in communication with the cavity, such that the first end and the second end of the clamping member extend into the cavity.

22. A clamping device comprising:
   a primary member comprising a cylindrical body having a front side and a rear side, with a central passage extending in an axial direction from the front side to the rear side and configured for receiving a mounting member therethrough;

a clamping member connected to the primary member and configured for selectively engaging the mounting member when the mounting member is received in the central passage, the clamping member comprising a substantially annular body that extends from a first end peripherally around the central passage of the primary member to a second end; and an actuator mechanism engaged with the clamping member and comprising:

an actuator pivotably connected to the primary member at a pivot connection, the actuator further having an eccentric connection spaced from the pivot connection, wherein the actuator comprises a lever extending from the pivot connection and a protrusion extending from the pivot connection in a different direction from the lever, wherein the eccentric connection is defined on the protrusion; and a pivot arm pivotably connected to the actuator at the eccentric connection, wherein the pivot arm engages the second end of the clamping member, wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and wherein when moving the actuator mechanism from the unlocked position to the locked position by pivoting the actuator, the pivot arm travels ahead of the eccentric connection in a first direction of travel of the eccentric connection, and when moving the actuator mechanism from the locked position to the unlocked position by pivoting the actuator, the pivot arm travels behind the eccentric connection in a second direction of travel of the eccentric connection.

23. A clamping device comprising:

a primary member comprising a cylindrical body having a front side and a rear side, with a central passage extending in an axial direction from the front side to the rear side and configured for receiving a mounting member therethrough, wherein the primary member further comprises a first cylindrical piece and a second cylindrical piece fixed together such that the central passage extends through both the first and second cylindrical pieces;

a clamping member connected to the primary member and configured for selectively engaging the mounting member when the mounting member is received in the central passage, the clamping member comprising a substantially annular body that extends from a first end peripherally around the central passage of the primary member to a second end; and an actuator mechanism engaged with the clamping member and comprising:

an actuator pivotably connected to the primary member at a pivot connection, the actuator further having an eccentric connection spaced from the pivot connection; and a pivot arm pivotably connected to the actuator at the eccentric connection, wherein the pivot arm engages the second end of the clamping member, wherein the pivot arm and a portion of the actuator forming the pivot connection and the eccentric connection are received between the first cylindrical piece and the second cylindrical piece of the primary member, wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and wherein when moving the actuator mechanism from the unlocked position to the locked position by pivoting the actuator, the pivot arm travels ahead of the eccentric connection in a first direction of travel of the eccentric connection, and when moving the actuator mechanism from the locked position to the unlocked position by pivoting the actuator, the pivot arm travels behind the eccentric connection in a second direction of travel of the eccentric connection.

24. A clamping device comprising:

a primary member comprising a cylindrical body having a front side and a rear side, with a central passage extending in an axial direction from the front side to the rear side and configured for receiving a mounting member therethrough;

a clamping member connected to the primary member and configured for selectively engaging the mounting member when the mounting member is received in the central passage, the clamping member comprising a substantially annular body that extends from a first end peripherally around the central passage of the primary member to a second end; and an actuator mechanism engaged with the clamping member and comprising:

an actuator pivotably connected to the primary member at a pivot connection, the actuator further having an eccentric connection spaced from the pivot connection, wherein the actuator comprises a lever extending from the pivot connection and a protrusion extending from the pivot connection in a different direction from the lever, wherein the eccentric connection is defined on the protrusion; and a pivot arm pivotably connected to the actuator at the eccentric connection, wherein the pivot arm engages the second end of the clamping member, wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and wherein when moving the actuator mechanism from the unlocked position to the locked position by pivoting the actuator, the pivot arm travels toward the second end of the clamping member to push the second end of the clamping member toward the first end, and when moving the actuator mechanism from the locked position to the unlocked position by pivoting the actuator, the pivot arm travels away from the second end of the clamping member.

25. A clamping device comprising:

a primary member comprising a cylindrical body having a front side and a rear side, with a central passage extending in an axial direction from the front side to the rear side and configured for receiving a mounting member therethrough;

a clamping member connected to the primary member and configured for selectively engaging the mounting member when the mounting member is received in the central passage, the clamping member comprising a substantially annular body that extends from a first end peripherally around the central passage of the primary member to a second end, wherein the cylindrical body of the clamping member has a wall surrounding the central passage, wherein a cavity is disposed within the wall of the cylindrical body and a slot extends through the wall, from the cavity to an exterior of the cylindrical body; and an actuator mechanism engaged with the clamping member and comprising:

an actuator pivotably connected to the primary member at a pivot connection, the actuator further having an eccentric connection spaced from the pivot connection; and a pivot arm pivotably connected to the actuator at the eccentric connection, wherein the pivot arm engages the second end of the clamping member, wherein the pivot arm and a portion of the actuator forming the pivot connection and the eccentric connection are received within the cavity, and wherein the actuator further includes a handle that extends out of the cavity through the slot, wherein the actuator mechanism is configured to be moveable by pivoting of the actuator about the pivot connection between an unlocked position, where the first end of the clamping member is spaced from the second end, and the clamping member does not securely engage the mounting member to permit the mounting member to be removed from the central passage, and a locked position, where the pivot arm engages the clamping member to move the first end and the second end closer together, causing the clamping member to securely engage the mounting member to resist movement of the primary member with respect to the mounting member, and wherein when moving the actuator mechanism from the unlocked position to the locked position by pivoting the actuator, the pivot arm travels toward the second end of the clamping member to push the second end of the clamping member toward the first end, and when moving the actuator mechanism from the locked position to the unlocked position by pivoting the actuator, the pivot arm travels away from the second end of the clamping member.

26. The clamping device of claim 25, wherein the cylindrical body further has a circumferential channel extending around the central passage, the circumferential channel receiving the clamping member therein, and wherein the circumferential channel is in communication with the cavity, such that the first end and the second end of the clamping member extend into the cavity.

\* \* \* \* \*